Jan. 19, 1926.
J. W. GAMBLE
1,569,959
DIFFERENTIAL PRESSURE GAUGE
Filed Feb. 2, 1921    2 Sheets-Sheet 1
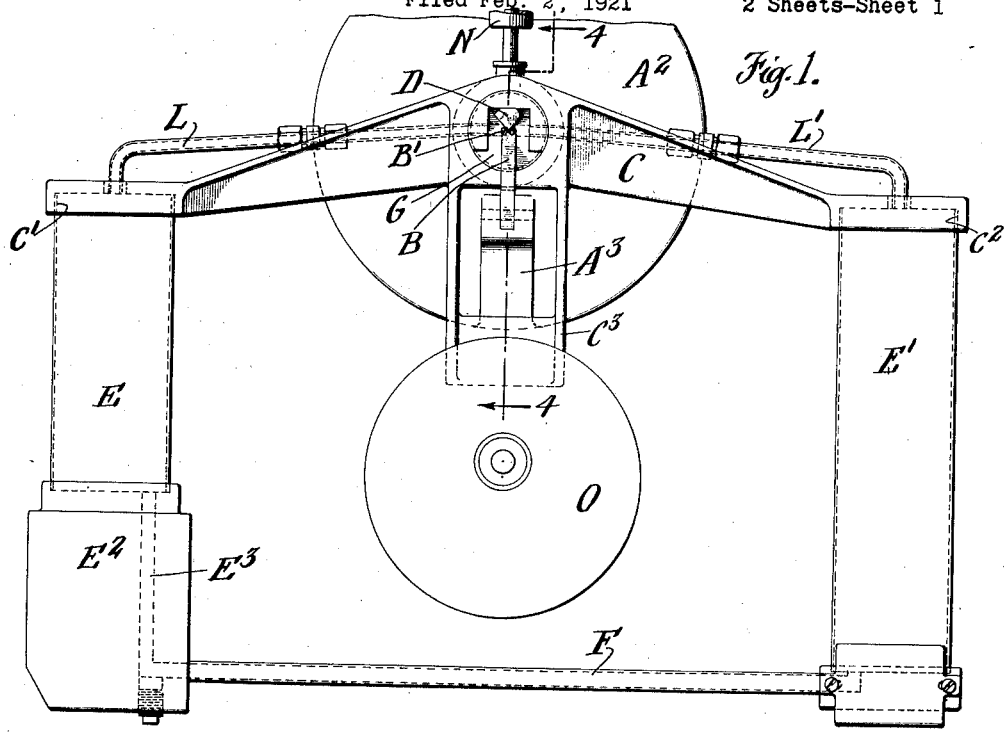
Fig. 1.
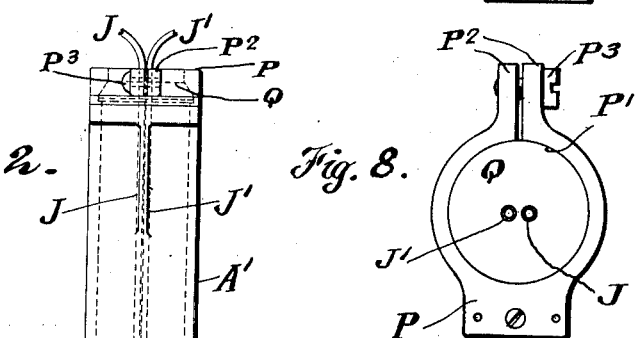
Fig. 2.
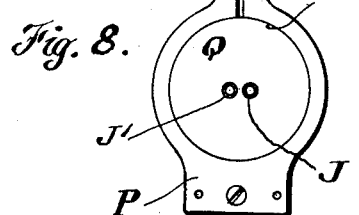
Fig. 8.
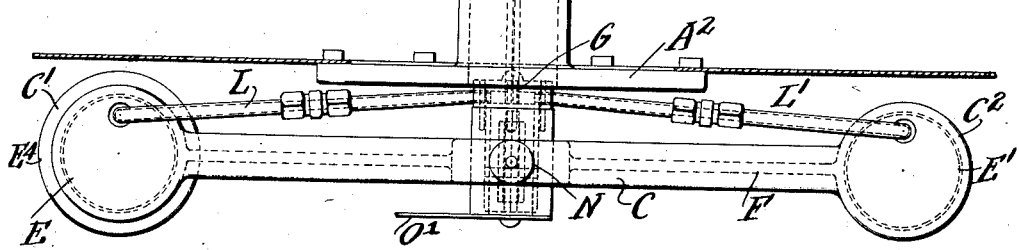
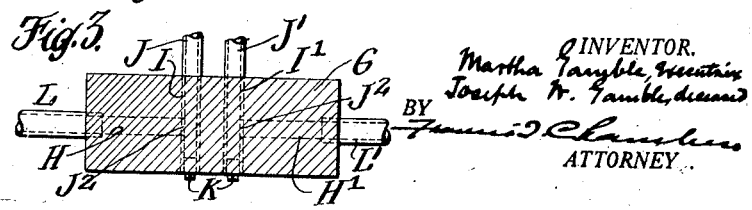
Fig. 3.
WITNESS.
Gustav Genzlinger.
INVENTOR.
Martha Gamble, executrix
Joseph W. Gamble, deceased
BY
ATTORNEY.

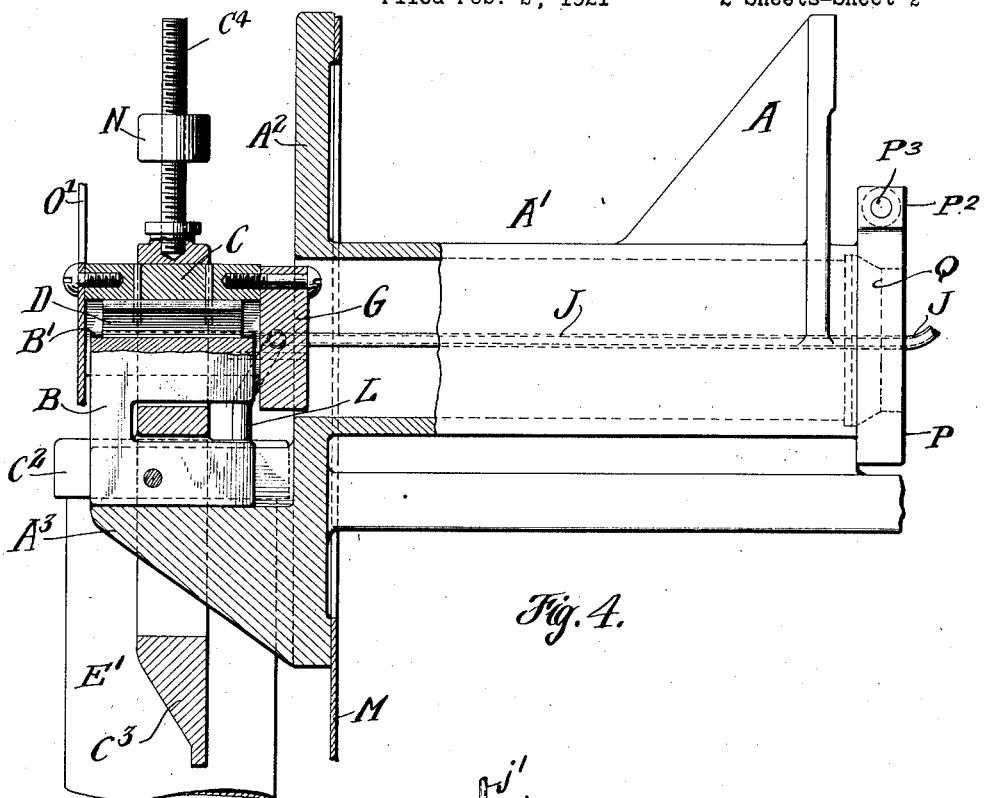
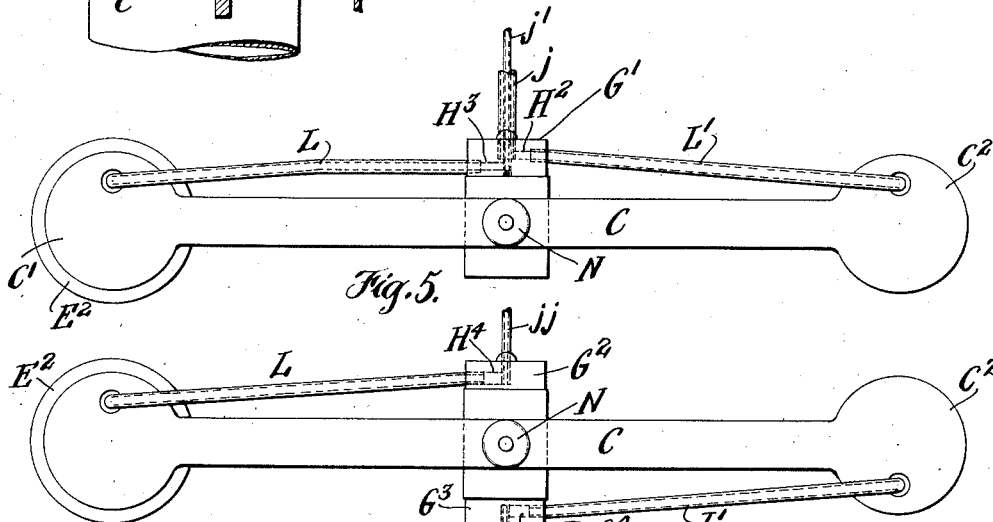
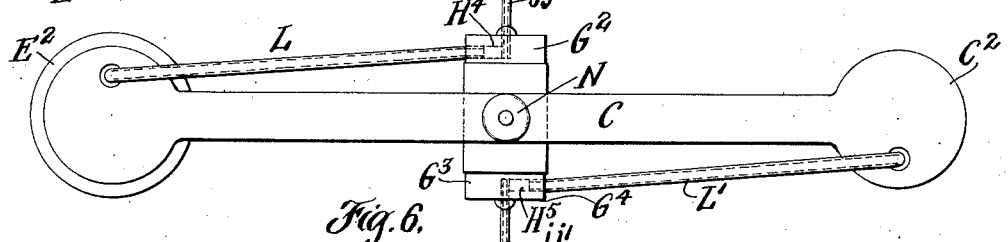
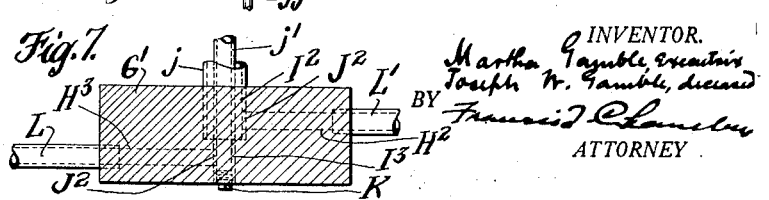

Patented Jan. 19, 1926.

1,569,959

UNITED STATES PATENT OFFICE.

JOSEPH W. GAMBLE, DECEASED, LATE OF PHILADELPHIA, PENNSYLVANIA; BY MARTHA GAMBLE, EXECUTRIX, OF PHILADELPHIA, PENNSYLVANIA, ASSIGNOR TO COCHRANE CORPORATION, OF PHILADELPHIA, PENNSYLVANIA, A CORPORATION OF PENNSYLVANIA.

DIFFERENTIAL PRESSURE GAUGE.

Application filed February 2, 1921. Serial No. 441,908.

*To all whom it may concern:*

Be it known that JOSEPH W. GAMBLE, deceased, late a citizen of the United States of America, residing in the city and county of Philadelphia, in the State of Pennsylvania, invented certain new and useful Improvements in Differential Pressure Gauges, of which the following is a true and exact description, reference being had to the accompanying drawings, which form a part thereof.

My invention relates to differential pressure gauges of the pivoted U tube type and has for its object to provide improved means for connecting the tubes of the U to the sources of pressure.

My invention consists, broadly speaking, in employing as a means for connecting the U tube structure to the sources of pressure, two torsional tubes preferably of thin metal connected to the structure in close proximity to its line of pivotal support and extending parallel to said line and to each other for a distance sufficient to insure that the movements of the tubes as the U frame moves on its pivot will be essentially a twisting or torsional movement. The use of these torsion tubes I have found enables the instrument to be easily and accurately adjusted and kept in good operative condition.

The nature of my invention and its preferred details of constructive embodiment will be best understood as described in connection with the drawing, in which—

Figure 1 is a front elevation of a flow meter embodying my invention.

Figure 2 a plan view.

Figure 3 a sectional view of the head to which the torsion tubes are secured.

Figure 4 a sectional elevation on line 4—4 of Fig. 1.

Figure 5 is a plan view of a modified construction.

Figure 6 a plan view of another modified construction.

Figure 7 a sectional view of the head shown in Fig. 5 and,

Figure 8 is a view of a detail.

A is the bracket on which the differential U tube gauge is supported. It is formed, as shown in Figs. 2 and 4, with a tubular passage A' extending in line with the line of pivotal support of the U tube frame, with a disc-like extension $A^2$ at the end of the tube and a bracket $A^3$ extending out from the disc and supporting a plate B having a V slot B' in its top edge to serve as a support for the knife edge pivot of the frame. C is the frame of the U tube gauge having laterally extending arms with heads C', $C^2$, at their ends. D is a knife edge pivot secured to the center of the frame C. E and E' are the tubes of the U gauge secured to the heads C' and $C^2$. The tube E is shorter than tube E' and has secured to its lower end a base $E^2$ with a pasage $E^3$ formed in it. F is a tube connecting pasage $E^3$ with the bottom of tube E'. G, Figs. 2, 3 and 4, is a head or block firmly secured to the frame C in such a way that it extends laterally over and lies in line with the knife edge D. The head G as shown, is formed with passages through it consisting of two perforations I and I' Fig. 3 lying in close proximity to the line of the knife edge pivot and two laterally extending perforations H and H'. J and J' are the torsion tubes through which the gauge is connected to the sources of pressure, not shown. These tubes are, as shown, forced into the perforations I and I' and have their ends closed by plugs K, K, and they connect with perforations H and H' through holes as indicated at $J^2$, $J^2$. L, L', are tubes leading from perforations H and H' to openings through heads C' and $C^2$ into the tubes E, E'. M, Fig. 4, is a disc secured to $A^2$ which may serve as an element of an indicator. N is an adjusting weight screwing on a rod $C^4$ attached to the frame C. O is a weight attached to arm $C^3$ of frame C. O' Fig. 4 is an indicator arm or pointer attached to frame C.

P, Figs. 2, 4 and 8, is a clamp secured at the end of the tubular passage A' having arms $P^2$ $P^2$ forming the split ring P' in which fits the disc Q having spaced perforations in which the torsion tubes J, J', pass and are held as shown. $P^3$ is a screw by means of which the split ring is clamped on the disc Q.

In the modification shown in Figs. 5 and 7 the head G' is formed with a perforation $I^2$ in line with the edge of the knife edge pivot and a concentric smaller perforation $I^3$ extending from the bottom of the hole $I^2$. The torsion tubes $j$ and $j'$ are here concentric, one lying within the other, the larger secured in perforation I² and the smaller in perforation I³. The laterally extending perforations are shown at H² and H³.

In the modification of Fig. 6, two heads G² and G³ are used one on each side of the frame C and torsion tubes indicated at $jj$ and $jj'$ are secured to the heads in the line of the knife edge and connect with tubes L L' through lateral perforations H⁴, H⁵.

The operation of my improved gauge is, of course, obvious. The U tube structure, as the mercury in its tubes shifts from side to side to compensate for differences in pressure transmitted through the torsion tubes, turns on its knife edge pivot and the torsion tubes are twisted to permit of the turning movement but as the tubes lie parallel and in close proximity to the line of pivotal support and are within the limits of the turning movement, perfectly elastic, the twisting of the tubes requires but little power and can be readily compensated for.

My construction avoids the use of any packing boxes and can be readily and accurately made and put together.

It is preferable that the torsion tubes should be kept in alignment and gripped in position at a proper distance from their attachment to the head G and for this purpose I secure the tubes in the disc Q as shown and secure the disc in proper position in the clamp P.

Having now described my invention, what I claim as new and desire to secure by Letters Patent, is:

1. A differential pressure gauge having in combination a pivoted U tube and means for connecting the tops of the U tube with the sources of pressure comprising two parallel torsional tubes made of thin elastic metal firmly connected at one end to the U tube structure in close proximity to its point of pivotal suspension extending for a considerable distance at right angles to its plane of oscillation and rigidly anchored at their other ends.

2. A differential pressure gauge comprising high and low pressure tubes connected at their lower ends, and a pivoted frame for supporting said tubes in combination with one or more heads rigidly connected to the frame and extending laterally over and around its point of pivotal suspension, said head or heads having passages formed in them, as described, straight torsional tubes made of thin elastic metal for connecting the gauge to the sources of differential pressure firmly connected to the head or heads in close proximity to the horizontal line passing through the point of pivotal suspension of the gauge frame and extending for a considerable distance parallel to said line and conduits connecting the passages in the head or heads to the tops of the tubes.

3. A differential pressure gauge comprising high and low pressure tubes connected at their lower ends, a frame in which said tubes are secured, a knife edge pivot secured to said frame and a supporting bracket having a laterally extending protected passage formed in it in line with the point of suspension of the frame, in combination with a head rigidly connected to the frame for the tubes and extending over and around its line of pivotal suspension on the bracket, said head being formed with passages, as described, a pair of straight torsional tubes made of thin elastic metal for connecting the gauge to the sources of differential pressure firmly connected to the head in close proximity to the line of pivotal support of the frame and extending parallel to said line for a considerable distance through the protected passage of the bracket and conduits connecting the passages in the head to the tops of the tubes.

MARTHA GAMBLE,
*Executrix of Joseph W. Gamble, deceased.*